(12) United States Patent
Nose et al.

(10) Patent No.: US 12,539,875 B2
(45) Date of Patent: Feb. 3, 2026

(54) VEHICLE CONTROL DEVICE, VEHICLE CONTROL METHOD, NON-TRANSITORY STORAGE MEDIUM

(71) Applicant: TOYOTA JIDOSHA KABUSHIKI KAISHA, Toyota (JP)

(72) Inventors: Masashi Nose, Nagoya (JP); Tomoaki Miyazawa, Nagoya (JP); Kazuya Kumazawa, Nagoya (JP); Miki Tsujino, Nagakute (JP); Tsukasa Kitazawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 161 days.

(21) Appl. No.: 18/495,320

(22) Filed: Oct. 26, 2023

(65) Prior Publication Data

US 2024/0174251 A1   May 30, 2024

(30) Foreign Application Priority Data

Nov. 25, 2022   (JP) ................................. 2022-188775

(51) Int. Cl.
 *B60Q 3/40* (2017.01)
 *B60W 30/18* (2012.01)
 *B60W 50/14* (2020.01)

(52) U.S. Cl.
 CPC ...... *B60W 50/14* (2013.01); *B60W 30/18163* (2013.01); *B60W 2050/146* (2013.01); *B60W 2540/10* (2013.01)

(58) Field of Classification Search
 CPC ...... B60W 50/14; B60W 30/12; B60W 50/10; B60W 2540/10; B60W 30/09; B60W 30/18163; B60W 2050/0074; B60W 2050/0096; B60W 2050/146; B60W 2540/18; B60W 2540/215; B60W 2540/225; B60W 2540/229; B60W 2552/53; B60W 2554/80; B60W 30/0956; B60W 30/10; B60W 30/14; B60W 30/16; B60W 50/082; B60W 50/085; B60W 60/0051; B60W 60/0053; B60W 60/0055; B60W 60/0059; B60W 2540/12;
(Continued)

(56) References Cited

U.S. PATENT DOCUMENTS 9,944,298 B2 * 4/2018 Yamada ................ B60W 50/10
2013/0151412 A1 * 6/2013 Spahl ................ G06Q 20/3224
   705/44
(Continued)

FOREIGN PATENT DOCUMENTS

JP   2016-137819 A    8/2016
JP   2020-163932 A   10/2020
JP      7156517 B2   10/2022

*Primary Examiner* — Daniel Previl
(74) *Attorney, Agent, or Firm* — Oblon, McClelland, Maier & Neustadt, L.L.P.

(57) ABSTRACT

In a vehicle capable of executing overtake assistance control including a first lane change control to move a vehicle traveling in a cruising lane to a target lane and a second lane change control to return the vehicle from the target lane to the cruising lane, the overtake assistance control is interrupted when an interrupt condition is established while the overtake assistance control is being executed and a display device extinguishes a first image and displays a second image.

7 Claims, 8 Drawing Sheets

(58) Field of Classification Search
CPC .............. B60K 35/28; B60K 2310/246; B60K 2310/248; B60K 2310/266; B60K 2310/268; B60K 35/10; B60K 35/80; B60K 2360/162; B60K 2360/175; B60K 2360/176; B60K 35/00; B60K 35/22; B60K 35/23; B60K 35/81; B60K 1/00; B60K 3/00; B60K 5/00; B60K 6/00; B60K 7/00; B60K 8/00; B60K 11/00; B60K 13/00; B60K 15/00; B62D 15/025; B62D 1/28; B62D 15/026; B60Q 5/006; B60Q 1/00; B60Q 3/00; B60Q 5/00; B60Q 7/00; B60Q 9/00; B60Q 11/00; B60Y 2300/18166; B60Y 2400/92; B60Y 2200/00; B60Y 2300/00; B60Y 2304/00; B60Y 2302/00; B60Y 2306/00; G08G 1/09; G08G 1/16; G08G 1/0125; G08G 7/00; G08G 5/00; G08G 3/00; G08G 1/00; G01S 19/28; G01S 19/396; G01S 19/40; G01S 19/426; G01S 19/44; G01S 19/49; G01S 1/00; G01S 3/00; G01S 5/00; G01S 7/00; G01S 11/00; G01S 13/00; G05D 1/0088; G05D 1/00; G05D 3/00; G05D 5/00; G05D 7/00; G05D 9/00; G05D 11/00; G05D 13/00; G05D 15/00; G05D 16/00; G05D 17/00; G05D 19/00; G05D 21/00; G05D 22/00; G05D 23/00; G05D 24/00; G05D 25/00; G05D 27/00; G05D 29/00; G05D 99/00; G05D 2101/00; G05D 2103/00; G05D 2105/00; G05D 2107/00; G05D 2109/00; G05D 2111/00

USPC ....... 340/438, 431, 433, 434, 435, 436, 464, 340/466–467, 488, 539.1, 539.11, 539.12, 340/539.13, 539.22

See application file for complete search history.

(56) References Cited

U.S. PATENT DOCUMENTS

| | | | |
|---|---|---|---|
| 2021/0237754 A1* | 8/2021 | Shiba | B60W 60/0051 |
| 2022/0018676 A1* | 1/2022 | Haugaard | G01C 21/3617 |
| 2022/0135039 A1* | 5/2022 | Jardine | B60W 30/18163 701/26 |
| 2022/0363092 A1* | 11/2022 | Copeland | B60L 53/126 |
| 2023/0401274 A1* | 12/2023 | Denninghoff | G06Q 30/0251 |

* cited by examiner

VEHICLE CONTROL DEVICE, VEHICLE CONTROL METHOD, NON-TRANSITORY STORAGE MEDIUM

CROSS-REFERENCE TO RELATED APPLICATION

This application is based on and claims priority under 35 USC 119 from Japanese Patent Application No. 2022-188775 filed on Nov. 25, 2022, the disclosure of which is incorporated by reference herein.

BACKGROUND

Technical Field

The present disclosure relates to a vehicle control device, a vehicle control method, and a non-transitory storage medium.

Related Art

A vehicle disclosed in Japanese Patent Application Laid-Open (JP-A) No. 2020-163932 is capable of executing overtake assistance control. A first lane change control to move a vehicle traveling in a cruising lane to a target lane, and a second lane change control to return the vehicle from the target lane to the cruising lane, are included in this overtake assistance control. Furthermore, a display device of the vehicle is able to display a first image when the vehicle is executing the overtake assistance control. The display device is also able to display a second image both prior to starting and after finishing the overtake assistance control.

The second lane change control is, for example, sometimes not executed after the vehicle has been moved to the target lane under the first lane change control. There is room for improvement in the JP-A No. 2020-163932 with respect to a display device control method in such cases.

In consideration of the above circumstances, an object of the present disclosure is to obtain a vehicle control device, a vehicle control method, and a non-transitory storage medium that readily make an occupant of a vehicle aware that overtake assistance control has been interrupted during execution.

SUMMARY

A vehicle control device of a first aspect of the present disclosure includes a processor and a display device. The processor configured to execute overtake assistance control including a first lane change control to move a vehicle traveling in a cruising lane to a target lane and a second lane change control to return the vehicle from the target lane to the cruising lane. The display device is configured to display a first image showing that the overtake assistance control is being executed when the processor is executing the overtake assistance control, and is configured to display a second image showing that the overtake assistance control is not being executed when the processor is not executing the overtake assistance control. When a specific interrupt condition has been satisfied during execution of the overtake assistance control by the vehicle, the processor interrupts the overtake assistance control and the display device removes the first image and displays the second image.

The processor of the vehicle control device of the first aspect is capable of executing the overtake assistance control including the first lane change control to move the vehicle traveling in the cruising lane to the target lane and the second lane change control to return the vehicle from the target lane to the cruising lane. The display device is capable of displaying the first image showing that the overtake assistance control is being executed when the vehicle is executing the overtake assistance control, and is capable of displaying the second image showing that the overtake assistance control is not being executed when the vehicle is not executing the overtake assistance control.

Furthermore, the processor interrupts the overtake assistance control when the specific interrupt condition has been satisfied during execution of the overtake assistance control by the vehicle. Furthermore, the display device extinguishes the first image and displays the second image when the interrupt condition has been satisfied. The vehicle control device of the first aspect accordingly readily makes the occupant of the vehicle aware that overtake assistance control has been interrupted during execution thereof.

The vehicle control device of a second aspect of the present disclosure is the first aspect, wherein the interrupt condition is satisfied when the vehicle has been moved from the cruising lane to the target lane under the overtake assistance control and a specific condition is satisfied during travel in the target lane.

In the second aspect, the interrupt condition is satisfied when the vehicle has been moved from the cruising lane to the target lane under the overtake assistance control and the specific condition is satisfied during travel in the target lane. The vehicle control device of the second aspect is accordingly able to make the occupant of the vehicle aware that the overtake assistance control has been interrupted during execution due to the specific condition being satisfied.

A vehicle control device of a third aspect of the present disclosure is the second aspect, wherein the specific condition is satisfied when an accelerator pedal of the vehicle has been depressed, or when during execution of adaptive cruise control by the vehicle a change is made to a higher value for a setting speed of the adaptive cruise control.

In the third aspect, the specific condition is satisfied when the accelerator pedal of the vehicle has been depressed, or when during execution of adaptive cruise control by the vehicle a change is made to a higher value for the setting speed therein. The vehicle control device of the third aspect is accordingly able to make the occupant of the vehicle aware that the overtake assistance control has been interrupted during execution when situations like these have arisen.

A vehicle control device of a fourth aspect of the present disclosure is the second aspect, wherein the processor determines whether or not the vehicle can be returned from the target lane to the cruising lane under the second lane change control when the vehicle has been moved from the cruising lane to the target lane under the overtake assistance control, and the specific condition is satisfied when the processor has determined that the vehicle is cannot be returned to the cruising lane.

The processor of the vehicle control device of the fourth aspect determines whether or not the vehicle can be returned from the target lane to the cruising lane under the overtake assistance control when the vehicle has been moved from the cruising lane to the target lane under the overtake assistance control. Furthermore, the specific condition is satisfied when the processor has determined that the vehicle is not able to be returned to the cruising lane. The vehicle control device of the fourth aspect is accordingly able to make the occupant of the vehicle aware that the overtake assistance control has been interrupted during execution when determined that the vehicle is not able to be returned to the cruising lane from the target lane under the overtake assistance control.

A vehicle control method of the present disclosure includes, by a processor, when a vehicle configured to execute overtake assistance control is executing the overtake assistance control, displaying a first image showing that the overtake assistance control is being executed on a display device of the vehicle, wherein the overtake assistance control includes a first lane change control to move from a cruising lane the vehicle is traveling in to a target lane and includes a second lane change control to return from the target lane to the cruising lane. The vehicle control method also includes displaying a second image on the display device showing that the overtake assistance control is not being executed when the vehicle is not executing the overtake assistance control, and includes, when a specific interrupt condition has been satisfied during execution of the overtake assistance control by the vehicle, interrupting the overtake assistance control and displaying the second image on the display device instead of the first image.

A non-transitory storage medium of the present disclosure stores a program executable by a computer to perform processing. The processing includes, when a vehicle capable of executing overtake assistance control is executing the overtake assistance control, displaying a first image showing that the overtake assistance control is being executed on a display device of the vehicle, wherein the overtake assistance control includes a first lane change control to move the vehicle from a cruising lane the vehicle is traveling in to a target lane and a second lane change control to return the vehicle from the target lane to the cruising lane. The processing also includes displaying a second image on the display device showing that the overtake assistance control is not being executed when the vehicle is not executing the overtake assistance control, and includes, when a specific interrupt condition has been satisfied during execution of the overtake assistance control by the vehicle, interrupting the overtake assistance control and displaying the second image on the display device instead of the first image.

As described above, the vehicle control device, the vehicle control method, and the non-transitory storage medium of the present disclosure exhibit the excellent advantageous effect of making an occupant of a vehicle aware that overtake assistance control has been interrupted during execution.

BRIEF DESCRIPTION OF THE DRAWINGS

Exemplary embodiments of the present disclosure will be described in detail based on the following figures, wherein.

DETAILED DESCRIPTION

Description follows regarding exemplary embodiments of a vehicle control device, a vehicle control method, and a non-transitory storage medium according to the present disclosure, with reference to the drawings. As appropriate in the drawings, an arrow FR indicates a vehicle front-rear direction front side, an arrow LH indicates a vehicle left-right direction left side, and an arrow UP indicates a vehicle height direction upper side.

Figure 1:
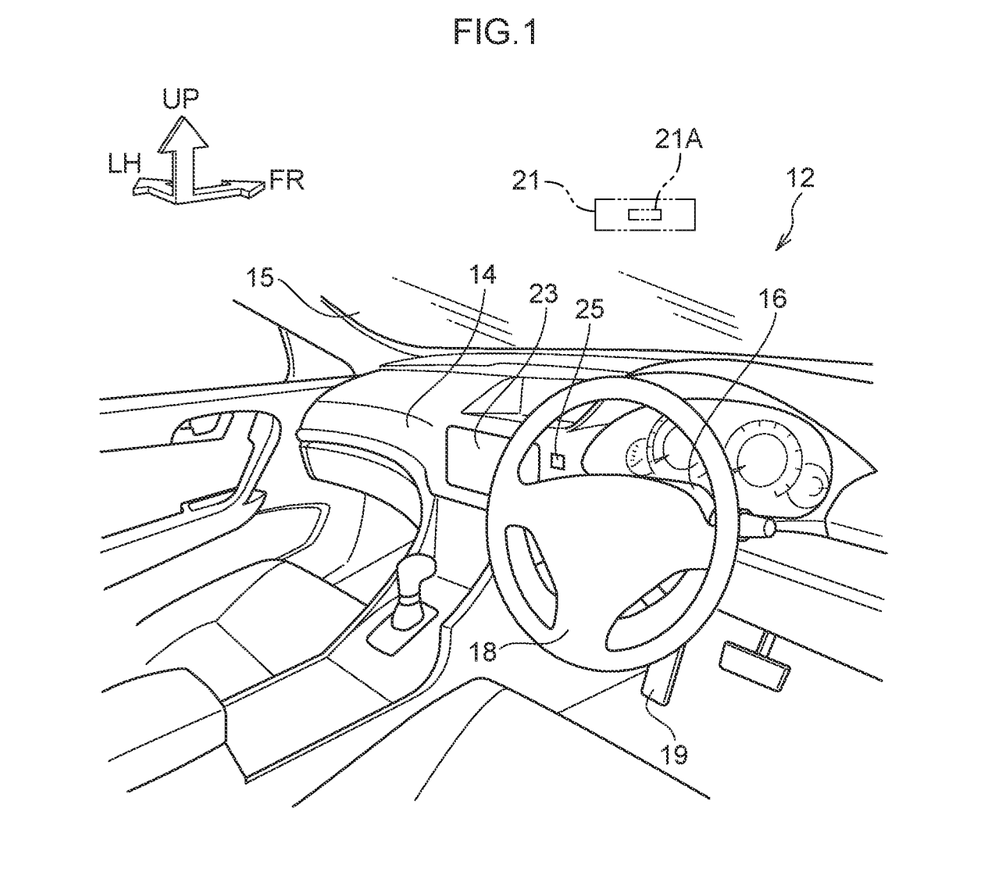
FIG. 1 is a diagram illustrating an interior of a vehicle equipped with a vehicle control device according to an exemplary embodiment.

A vehicle 12 installed with a vehicle control device 10 includes an instrument panel 14 and a front windshield 15 such as illustrated in FIG. 1. A steering column 16 is provided to the instrument panel 14, and a steering wheel 18 is supported by the steering column 16 so as to be able to rotate.

As illustrated in FIG. 1, a sensor unit 21 is provided to an upper portion of a vehicle inside face of the front windshield 15. The sensor unit 21 includes a camera 21A that captures an imaging subject at a position in front of the front windshield 15 through the front windshield 15, a millimeter wave radar that transmits probe waves and receives reflected waves (omitted in the drawings), and a laser imaging detection and ranging (LIDAR) that scans in front of the vehicle 12 (omitted in the drawings). The vehicle 12 also includes plural cameras (omitted in the drawings) separate to the camera 21A. These cameras are collectively called a surrounding monitoring camera group.

Figure 2:
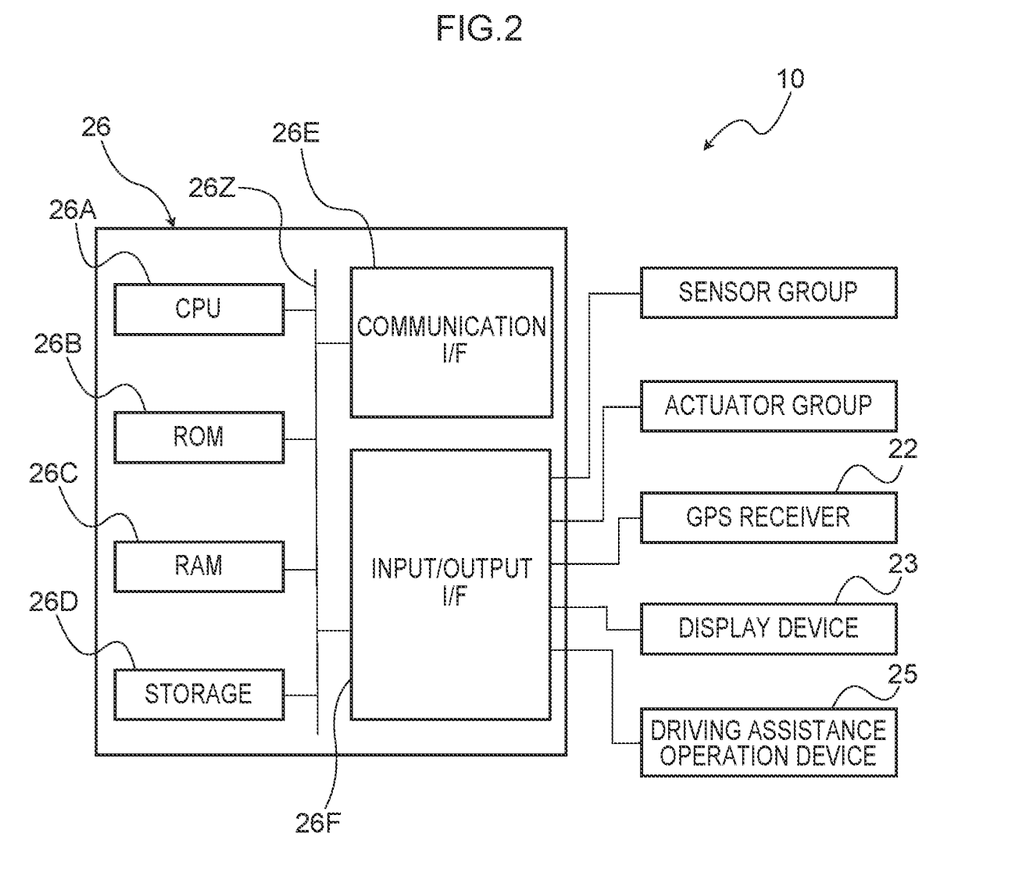
FIG. 2 is a diagram illustrating a hardware configuration of the vehicle illustrated in FIG. 1.

As illustrated in FIG. 2, the vehicle 12 includes a global positioning system (GPS) receiver 22. The GPS receiver 22 acquires information related to a position where the vehicle 12 is traveling by receiving GPS signals transmitted by GPS satellites (hereafter referred to as "location information").

As illustrated in FIG. 1 and FIG. 2, a display device 23 is provided to the instrument panel 14.

As illustrated in FIG. 1 and FIG. 2, a driving assistance operation device 25 is provided to the instrument panel 14. The driving assistance operation device 25 is a device to execute driving assistance control on the vehicle 12, as described later. The vehicle 12 is able to execute driving assistance control when the driving assistance operation device 25 is in an ON state. The vehicle 12 is not able to execute driving assistance control when the driving assistance operation device 25 is in an OFF state.

As illustrated in FIG. 2, the vehicle 12 includes an electronic control unit (ECU) 26 serving as hardware configuration.

The ECU 26 is configured including a central processing unit (CPU) (processor) (computer) 26A, read only memory (ROM) (non-transitory storage medium) (recording medium) 26B, random access memory (RAM) 26C, storage (non-transitory storage medium) (recording medium) 26D, a communication I/F 26E, and an input/output I/F 26F. The CPU 26A, the ROM 26B, the RAM 26C, the storage 26D, the communication I/F 26E, and the input/output I/F 26F are connected together through an internal bus 26Z so as to be capable of communicating with each other.

The CPU 26A is a central processing unit that executes various programs and controls each section. The CPU 26A reads a program from the ROM 26B or the storage 26D, and executes the program using the RAM 26C as workspace. The CPU 26A performs control of each configuration and various computation processing according to programs stored on the ROM 26B or the storage 26D.

The ROM 26B stores various programs and various data. The RAM 26C serves a workspace to temporarily store a program or data. The storage 26D is configured by a storage device such as a hard disk drive (HDD), solid state drive (SSD), or the like, and stores various programs and various data. A navigation system including map data is also, for example, installed on the ROM 26B or the storage 26D. Namely, the navigation system is installed in the vehicle 12. Furthermore, the ROM 26B or the storage 26D is also stored with normal-time image data representing a highway image (normal-time image) (second image) 30 and car images (normal-time images) (second images) 35A, 35B, 35C, and stored with overtaking-time image data representing a highway image (overtaking-time image) (first image) 40, car images (overtaking-time images) (first images) 45A, 45B, 45C, and an ego-vehicle image (overtaking-time image) (first image) 47. The normal-time image data and the overtaking-time image data are described later.

The communication I/F 26E is an interface for connecting the ECU 26 to other ECUs (omitted in the drawings) through an external bus (omitted in the drawings). This interface employs, for example, a communication standard under a CAN protocol.

The input/output I/F 26F is an interface for communication with various devices. These devices include, for example, the camera 21A, the millimeter wave radar, the LIDAR, the surrounding monitoring camera group, the GPS receiver 22, the display device 23, the driving assistance operation device 25, and an actuator group (described later).

Figure 3:
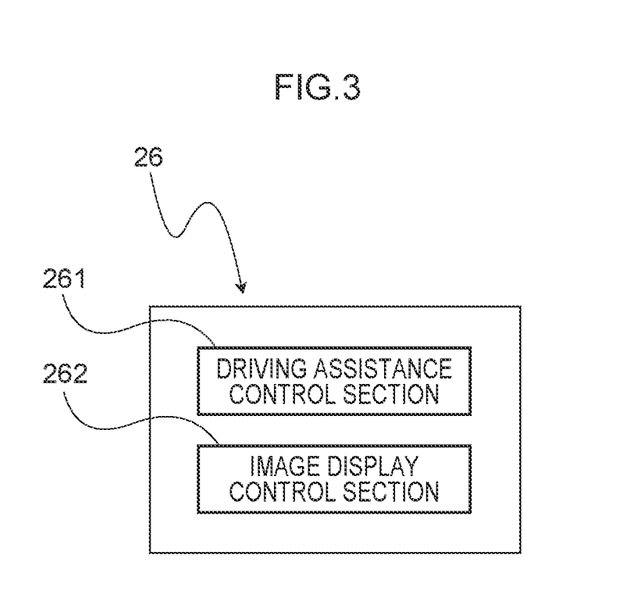
FIG. 3 is a functional block diagram of an ECU illustrated in FIG. 2.

FIG. 3 illustrates a block diagram as an example of a functional configuration of the ECU 26. The ECU 26 incudes, as functional configuration, a driving assistance control section 261, and an image display control section 262. The driving assistance control section 261 and the image display control section 262 are implemented by the CPU 26A reading and executing the program stored on the ROM 26B.

When the driving assistance operation device 25 is in an ON state, the driving assistance control section 261 utilizes the sensor group and the actuator group (omitted in the drawings) provided to the vehicle 12, and executes driving assistance control in the vehicle 12 of level 1 to level 5 automation in the driving automation scale (the automated driving scale) as defined by the Society of Automotive Engineers (SAE). Moreover, when the driving assistance operation device 25 is in the ON state, a level of driving automation and driving assistance control execution are selectable by an action of an occupant of the vehicle 12 on the driving assistance operation device 25. The driving assistance control of the present exemplary embodiment includes, for example, adaptive cruise control (ACC), lane keeping assist control/lane tracing assist (LTA), lane change assist control/lane change assist (LCA), and overtake assistance control. The sensor group provided to the vehicle 12 includes the sensor unit 21 and the surrounding monitoring camera group. The actuator group provided to the vehicle 12 includes various electrical actuators for driving the brake system, electric power steering including the steering wheel 18, and an internal combustion engine serving as a driving source, and includes an electric motor serving as a driving source.

Description follows regarding overtake assistance control. A first lane change control and a second lane change control are included in the overtake assistance control. The first lane change control and the second lane change control are controls similar to LCA.

Figure 4:
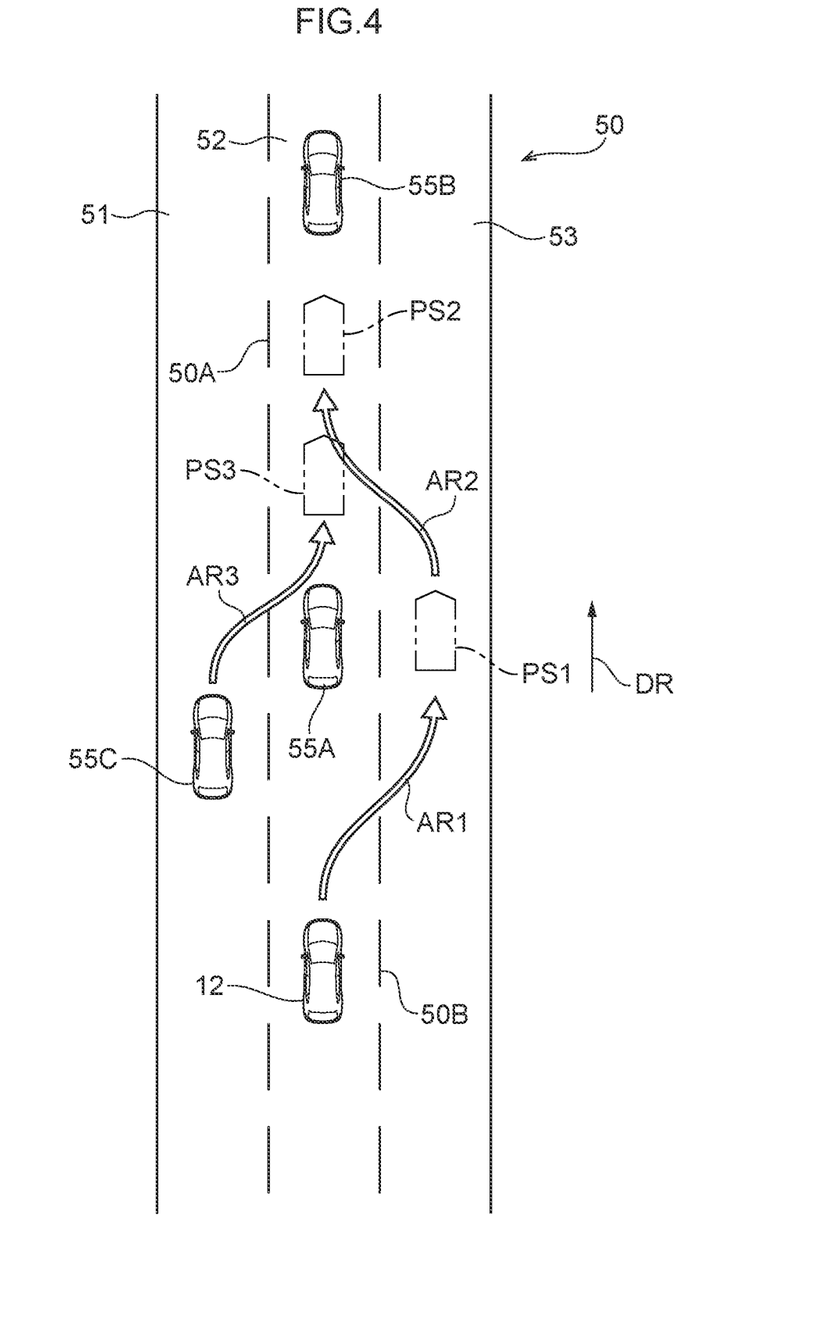
FIG. 4 is a plan view of the vehicle illustrated in FIG. 1, together with surrounding vehicles and highway.

When a specific first condition has been satisfied, the driving assistance control section 261 displays text expressing a first confirmation request on the display device 23. For example, the display device 23 displays text of "Execute overtake assistance control?" as text expressing the first confirmation request. Suppose that the vehicle 12 is traveling on a highway 50 as illustrated in FIG. 4. The highway 50 is a traffic way in a country with a regulation stipulating that vehicles should keep to the left side. The highway 50 includes a first lane 51, a second lane 52, and a third lane 53. The first lane 51 and the second lane 52 are demarcated by a demarcation line 50A, and the second lane 52 and the third lane 53 are demarcated by a demarcation line 50B. An arrow DR illustrated in FIG. 4 indicates a progression direction of the vehicle 12. For example, the first condition is satisfied, when the vehicle 12 traveling in the second lane 52 executes ACC, and a difference between a set speed of the vehicle 12 as set by the ACC and a speed of an other-vehicle 55A traveling immediately in front of the vehicle 12 becomes a specific value or lower.

The driving assistance control section 261 starts the first lane change control when an occupant performs a first acknowledgement action after the text expressing the first confirmation request has been displayed on the display device 23. For example, a specific action performed with respect to the driving assistance operation device 25 by the occupant gripping the steering wheel 18 with their hands and visually checking a lane change direction is a first acknowledgement action. When the first lane change control has been started, the driving assistance control section 261 monitors the surroundings of the vehicle 12 based on information acquired from the sensor group. Furthermore, the driving assistance control section 261 moves the vehicle 12 to the right side after determination that the vehicle 12 is able to execute a lane change to the right side safely. For example, when determination is made that the vehicle 12 is able to change lanes to the third lane 53 along a travel path AR1 of FIG. 4, the driving assistance control section 261 controls the above actuator group such that the vehicle 12 is moved from the second lane (cruising lane) 52 to the third lane 53 (target lane) that is the lane adjacent to the second lane 52 on the right. For example, the driving assistance control section 261 ends the first lane change control when the vehicle 12 has been moved as far as a position PS1 on the third lane 53 along the travel path AR1.

At a first time that is the time when the first lane change control finished, the driving assistance control section 261 starts determination as to whether or not the vehicle 12 would be able to safely execute a lane change to the left side based on information acquired from the sensor group. In other words, the driving assistance control section 261 starts determination as to whether or not the second lane change control is executable. The driving assistance control section 261 displays text expressing a second confirmation request on the display device 23 when determined that the second lane change control is executable. For example, the driving assistance control section 261 displays text expressing a second confirmation request on the display device 23 when determined that the vehicle 12 that had moved to the position PS1 of FIG. 4 is able to perform a lane change to the second lane 52 along a travel path AR2 of FIG. 4. For example, the display device 23 displays text of "Return to original lane?" as text expressing the second confirmation request.

The driving assistance control section 261 starts the second lane change control when the occupant performs a second acknowledgement action after text expressing the second confirmation request has been displayed on the display device 23. For example, a specific action on the driving assistance operation device 25 is the second acknowledgement action. When the second lane change control has been started, the driving assistance control section 261 moves the vehicle 12 to the left while monitoring surroundings of the vehicle 12 based on information acquired from the sensor group. For example, the driving assistance control section 261 controls the above actuator group so as to move the vehicle 12 from the third lane 53 to the second lane 52. The driving assistance control section 261 ends the second lane change control when, for example, the vehicle 12 has moved along the travel path AR2 as far as a position PS2 on the second lane 52.

On the other hand, the driving assistance control section 261 determines that a first interrupt condition (specific condition) (interrupt condition) has been satisfied in cases in which the driving assistance control section 261 is still not able to make a determination that the second lane change control is executable up to elapse of a specific threshold time from the first time. The threshold time is, for example, 30 seconds. The first interrupt condition is, for example, satisfied when an other-vehicle 55C traveling in the first lane 51 of FIG. 4 moves along a travel path AR3 to a position PS3 in the second lane 52. Moreover the first interrupt condition is also satisfied when, for example, due to a drop in speed of an other-vehicle 55B traveling in the second lane 52 of FIG. 4, an inter-vehicle distance between the vehicle 12 and an other-vehicle 55B is predicted to be less than a specific value were the vehicle 12 to move to the position PS2.

Moreover, the driving assistance control section 261 determines the specific second interrupt condition (interrupt condition) to have been satisfied when the specific second condition (specific condition) has been satisfied due to action of the occupant in a period of time from when the first time elapsed to when the second acknowledgement action is performed. For example, the second condition is satisfied when the accelerator pedal 19 of the vehicle 12 is depressed by the occupant (see FIG. 1), or when the occupant has utilized the driving assistance operation device 25 to change the setting speed of the ACC being executed to a higher speed than the current speed.

The image display control section 262 identifies the highway that the vehicle 12 is traveling on based on the car navigation system (map data) and location information. The image display control section 262 also reads map data of the car navigation system and displays an image of the highway currently travelled by the vehicle 12 on the display device 23. For example, supposes that the vehicle 12 is traveling on the highway 50 illustrated in FIG. 4. In this case the image display control section 262 is able to display two types of highway image based on the highway 50 on the display device 23. Namely, the image display control section 262 is able to selectively display a highway image 30 illustrated in FIG. 5, or a highway image 40 illustrated in FIG. 6, on the display device 23.

Figure 5:
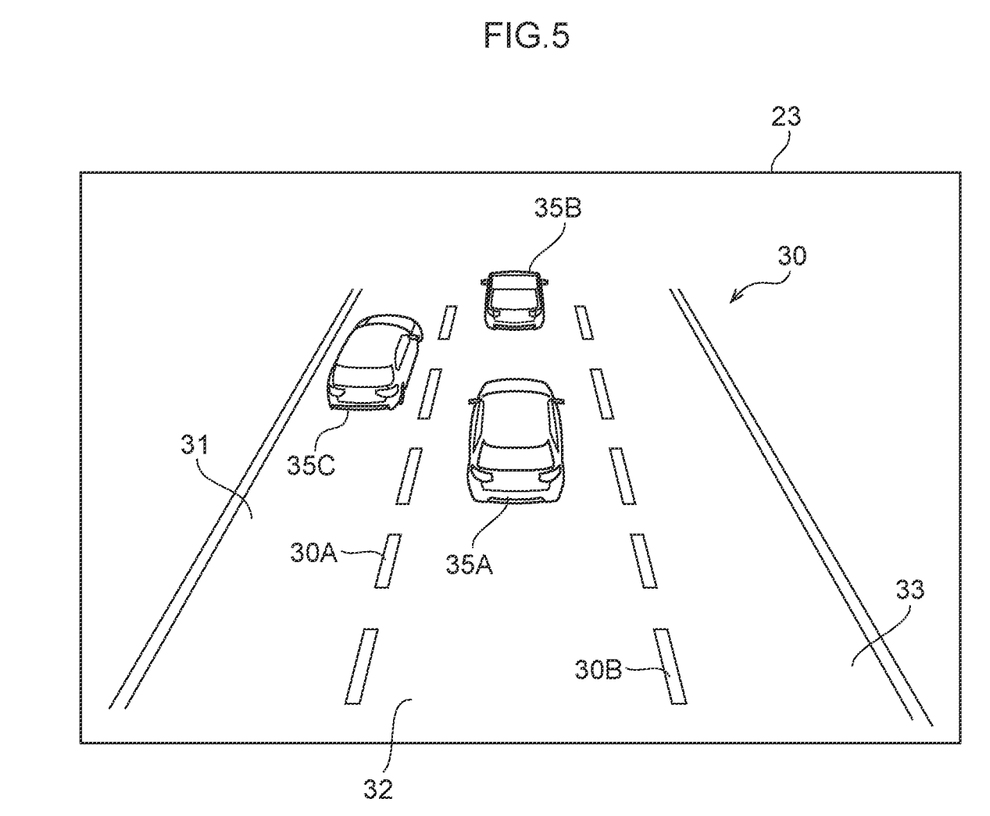
FIG. 5 is a diagram illustrating a display device displaying a normal-time image.

When not executing overtake assistance control, the image display control section 262 acquires normal-time image data representing the highway. Namely, the image display control section 262 displays the highway image (normal-time image) (second image) 30 on the display device 23 such as illustrated in FIG. 5 prior to overtake assistance control being executed, after overtake assistance control has finished, or when overtake assistance control has been interrupted. The highway image 30 includes a first lane image 31, a second lane image 32, and a third lane image 33. The first lane image 31 and the second lane image 32 are demarcated by a demarcation line image 30A, and the second lane image 32 and the third lane image 33 are demarcated by a demarcation line image 30B.

Moreover, when the overtake assistance control is not being executed, the image display control section 262 utilizes camera images (image data) representing imaging subjects at positions in the surroundings of the vehicle 12 as acquired by the camera 21A and the surrounding monitoring camera group and utilizes a pattern matching method to determine whether or not there is a surrounding vehicle at a position in the surroundings of the vehicle 12 in these camera images. The image display control section 262 also acquires normal-time image data representing any surrounding vehicles when determined that there is a surrounding vehicle included in the camera images. Consider a situation in which, for example as illustrated in FIG. 4, the vehicle 12 and cars 55A, 55B, which are two surrounding vehicles at positions in front of the vehicle 12, are traveling in the second lane 52, and a car 55C that is another surrounding vehicle is traveling in the first lane 51. In such a situation the image display control section 262 ascertains the relative positions of each of the surrounding vehicles with respect to the vehicle 12 based on detection results of the sensor group and camera images. The image display control section 262 also, as illustrated in FIG. 5, displays car images (normal-time images) (second images) 35A, 35B, 35C representing each of the surrounding vehicles on the display device 23 based on these relative positions.

Figure 7:
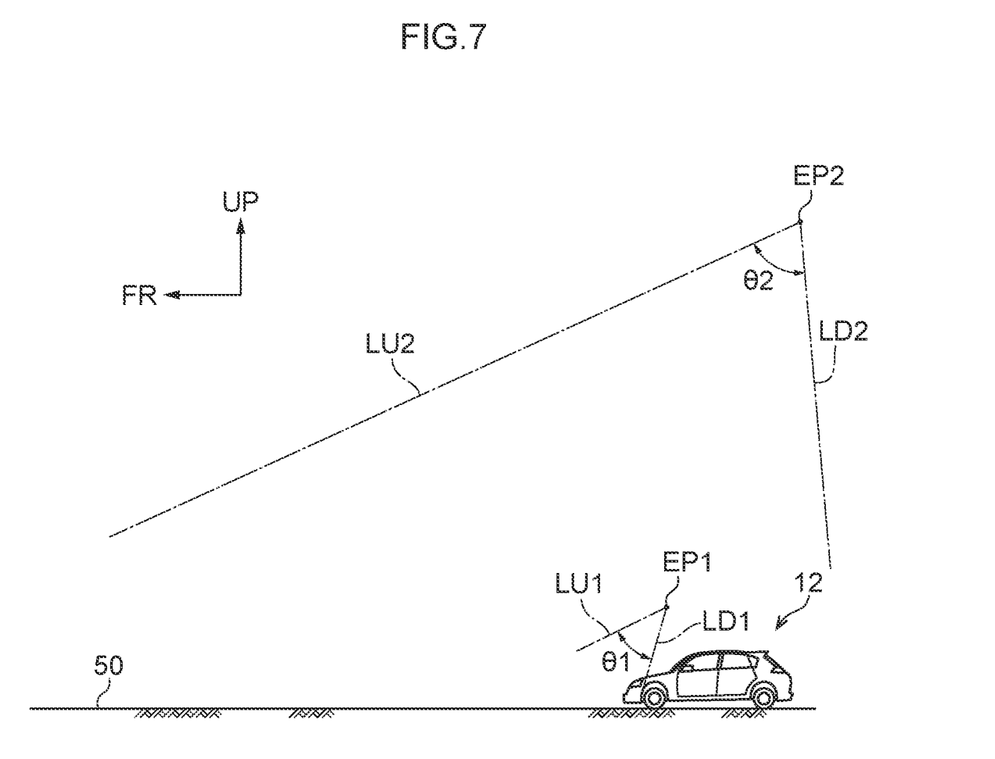
FIG. 7 is a side view diagram of a highway and a vehicle.

The highway image 30 and the car images 35A, 35B, 35C represent a scene looking diagonally forward from a virtual view point EP1 (see FIG. 7) at a position appearing above a upper edge of the vehicle 12 in side view. A range of the highway image 30 in side view is a range between two straight lines LU1, LD1 extending from the virtual view point EP1. An angle formed between the straight line LU1 and the straight line LD1 in side view is θ1.

Figure 6:
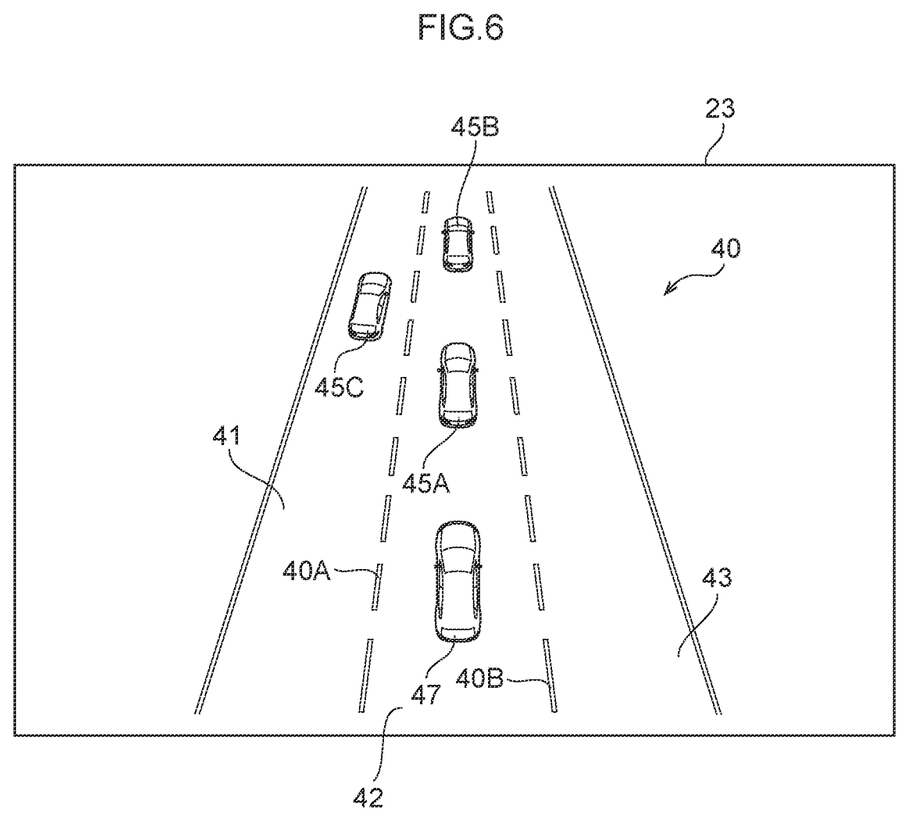
FIG. 6 is a diagram illustrating a display device displaying an overtaking-time image.

When the overtake assistance control is being executed, the image display control section 262 acquires overtaking-time image data representing the highway. Namely, when the overtake assistance control is being executed, the image display control section 262 displays a highway image (overtaking-time image) (first image) 40 such as illustrated in FIG. 6 on the display device 23. The highway image 40 includes a first lane image 41, a second lane image 42, and a third lane image 43. The first lane image 41 and the second lane image 42 are demarcated by a demarcation line image 40A, and the second lane image 42 and the third lane image 43 are demarcated by a demarcation line image 40B.

Furthermore, when the overtake assistance control is being executed, the image display control section 262 utilizes the camera images and pattern matching method to determine whether or not there is a surrounding vehicle included in the camera images. The image display control section 262 then acquires respective overtaking-time images of any surrounding vehicles when determined that there is a surrounding vehicle in the camera images. For example, in cases in which the vehicle 12 and the cars 55A, 55B, 55C are traveling on the highway 50 of FIG. 4, the image display control section 262 ascertains the relative positions of each of the surrounding vehicles with respect to the vehicle 12 based on detection results of the sensor group and camera images. Then based on these relative positions, the image display control section 262 displays car images (overtaking-time images) (first images) 45A, 45B, 45C representing each of the surrounding vehicles on the display device 23, as illustrated in FIG. 6. Ego-vehicle image data representing the vehicle 12 is also included in the overtaking-time image data. As illustrated in FIG. 6, the image display control section 262 also displays an ego-vehicle image 47 (overtaking-time image) (first image) based on the ego-vehicle image data on the display device 23.

The highway image 40, the car images 45A, 45B, 45C, and the ego-vehicle image 47 express a scene looking diagonally forward from a virtual view point EP2 (see FIG. 7) at a position appearing above the virtual view point EP1 in side view. The range of the highway image 40 in side view is a range between two straight lines LU2, LD2 extending from the virtual view point EP2. An angle formed between the straight line LU2 and the straight line LD2 in side view is θ2.

The GPS receiver 22, the display device 23, the driving assistance operation device 25, the ECU 26, the sensor group, and the actuator group are configuration elements of the vehicle control device 10.

Operation and Advantageous Effects

Next, description follows regarding the operation and advantageous effects of the present exemplary embodiment.

Next, description follows regarding processing executed by the CPU 26A of the ECU 26. The CPU 26A repeats execution of the processing of the flowchart illustrated in FIG. 8 each time the specific period of time elapses.

Figure 8:
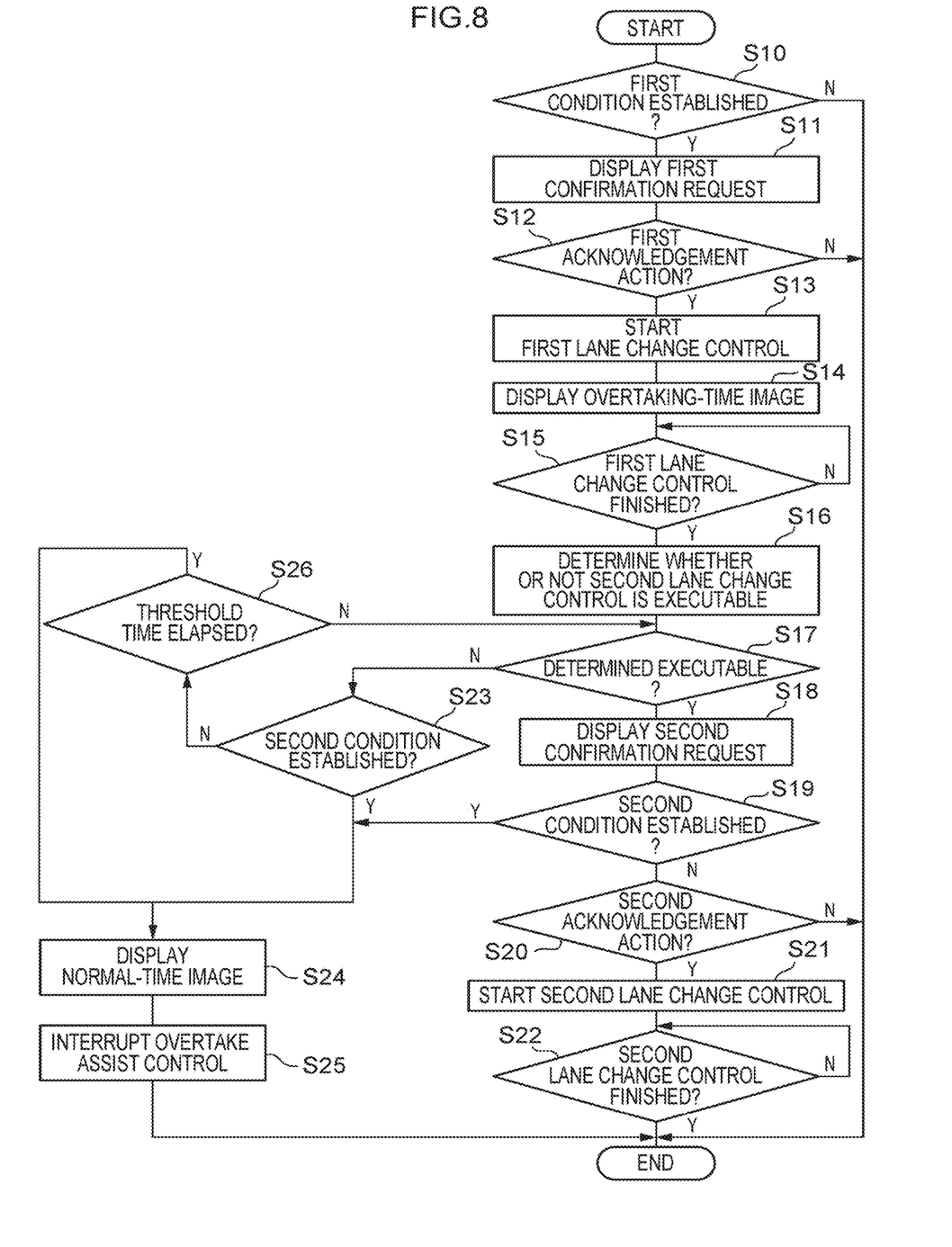
FIG. 8 is a flowchart illustrating processing executed by a CPU of an ECU.

At step S10 ("step" will be omitted hereafter), the CPU 26A determines whether or not the first condition is satisfied. At this time the normal-time image is being displayed on the display device 23.

The CPU 26A proceeds to S11 in cases in which determination was YES at S10, and text expressing the first confirmation request is displayed on the display device 23 for a duration of the specific period of time.

Next, the CPU 26A proceeds to S12 and determines whether or not the first acknowledgement action was performed within the specific period of time.

The CPU 26A proceeds to S13 in cases in which determination was YES at S12 and starts the first lane change control.

The CPU 26A proceeds to S14 when the processing of S13 has finished, and displays the overtaking-time images (the highway image 40, the car images 45A, 45B, 45C, and the ego-vehicle image 47) on the display device 23.

The CPU 26A proceeds to S15 when the processing of S14 is finished and determines whether or not the first lane change control has finished.

The CPU 26A proceeds to S16 in cases in which determination was YES at S15 and performs determination as to whether or not the second lane change control is executable.

The CPU 26A then proceeds to S17. The CPU 26A proceeds to S18 when determined that the second lane change control is executable, and text expressing the second confirmation request is displayed on the display device 23 for the specific period of time.

Next, the CPU 26A proceeds to S19 and determines whether or not the second condition has been satisfied.

The CPU 26A proceeds to S20 in cases in which determination was NO at S19 and determines whether or not the second acknowledgement action has been performed during the specific period of time from when text expressing the second confirmation request is being displayed.

The CPU 26A proceeds to S21 in cases in which determination was YES at S20 and starts the second lane change control.

The CPU 26A proceeds to S22 when the processing of S21 has finished and determines whether or not the second lane change control has finished.

On the other hand, the CPU 26A proceeds to S23 when NO was determined at S17 and determines whether or not the second condition has been satisfied.

The CPU 26A proceeds to S24 in cases in which determination was YES at S23, and displays the normal-time images (the highway image 30, the car images 35A, 35B, 35C) on the display device 23 instead of the overtaking-time images. The CPU 26A proceeds to S24 in cases in which determination was YES at S19 and displays the normal-time images on the display device 23 instead of the overtaking-time images.

The CPU 26A proceeds to S25 when the processing of S24 has finished and interrupts the overtake assistance control.

The CPU 26A proceeds to S26 when NO was determined at S23 and determines whether or not determination that the second lane change control is executable has been made from the first time until elapse of the specific threshold time.

The CPU 26A proceeds to S24 in cases in which determination was YES at S26. The CPU 26A proceeds to S17 in cases in which NO was determined at S26.

The CPU 26A temporarily ends the processing of the flowchart of FIG. 8 when NO was determined at S10, S12, or S20, when YES was determined at S22, or when the processing of S25 has finished.

As described above, the vehicle control device 10 of the present exemplary embodiment is able to execute the overtake assistance control including the first lane change control to move the vehicle 12 traveling in a cruising lane (second lane 52) to a target lane (the third lane 53), and including the second lane change control to return the vehicle 12 from the target lane to the cruising lane. Furthermore, when the vehicle 12 is executing the overtake assistance control, the display device 23 is able to display the overtaking-time images (the highway image 40, the car images 45A, 45B, 45C, and the ego-vehicle image 47) showing that the overtake assistance control is being executed. Furthermore, when the vehicle 12 is not executing the overtake assistance control, the display device 23 is able to display the normal-time images (the highway image 30, the car images 35A, 35B, 35C) showing that the overtake assistance control is not being executed.

Furthermore, the driving assistance control section 261 determines that the first interrupt condition has been satisfied when the driving assistance control section 261 was unable to determine that the second lane change control is executable up to elapse of a period of time equivalent to a threshold time from the first time. Furthermore, the display device 23 displays the normal-time images instead of the overtaking-time images when the first interrupt condition has been satisfied. The occupant of the vehicle 12 looking at the display device 23 is thereby able to be aware that the overtake assistance control has been interrupted by determination of the vehicle control device 10 during execution thereof.

Moreover, the driving assistance control section 261 determines the second interrupt condition has been satisfied when the accelerator pedal 19 of the vehicle 12 has been depressed during execution of the overtake assistance control, or when a change to a higher value has been made for the setting speed of ACC during execution thereof by the vehicle 12. Furthermore, the display device 23 displays the normal-time images instead of the overtaking-time images when the second interrupt condition has been satisfied. The occupant looking at the display device 23 is accordingly able to be aware that the overtake assistance control has been interrupted by an occupant driving action during execution thereof.

Although the vehicle control device 10, the vehicle control method, and the non-transitory storage medium according to the exemplary embodiment have been described above, appropriate design changes may be made thereto within a range not departing from the spirit of the present disclosure.

For example, as long as the first image and the second image are different to each other, they may be images different to the images described above. For example, the first image and the second image may be camera images acquired by cameras.

The driving assistance control section 261 may start the overtake assistance control using an action by the occupant of the vehicle 12 as a trigger. For example, the driving assistance control section 261 may start the overtake assistance control using performance of a specific action performed on the driving assistance operation device 25 by the occupant as the trigger.

The first lane change control and the second lane change control may be control to move the vehicle 12 across plural lanes. For example, the vehicle 12 may be moved from the first lane (cruising lane) 51 in FIG. 4 to the third lane (target lane) 53 therein under the first lane change control, and moreover returned to the first lane (cruising lane) 51 from the third lane (target lane) 53 under the second lane change control.

What is claimed is:

1. A vehicle control device, comprising:
a processor that is configured to execute overtake assistance control including a first lane change control to move a vehicle traveling in a cruising lane to a target lane and a second lane change control to return the vehicle from the target lane to the cruising lane; and
a display device that is configured to display a first image showing that the overtake assistance control is being executed when the processor is executing the overtake assistance control, and that is configured to display a second image showing that the overtake assistance control is not being executed when the processor is not executing the overtake assistance control,
wherein, when a specific interrupt condition has been satisfied during execution of the overtake assistance control by the vehicle, the processor interrupts the overtake assistance control and the display device removes the first image and displays the second image.

2. The vehicle control device of claim 1, wherein the interrupt condition is satisfied when the vehicle has been moved from the cruising lane to the target lane under the overtake assistance control and a specific condition is satisfied during travel in the target lane.

3. The vehicle control device of claim 2, wherein the specific condition is satisfied when an accelerator pedal of the vehicle has been depressed, or when, during execution of adaptive cruise control by the vehicle, a change is made to a higher value for a setting speed of the adaptive cruise control.

4. The vehicle control device of claim 2, wherein:
the processor determines whether or not the vehicle can be returned from the target lane to the cruising lane under the second lane change control when the vehicle has been moved from the cruising lane to the target lane under the overtake assistance control; and
the specific condition is satisfied when the processor has determined that the vehicle cannot be returned to the cruising lane.

5. The vehicle control device of claim 1, wherein the first image and the second image include an image of the cruising lane, an image of the target lane, and an image of the vehicle, and the first image and the second image are different in content from each other.

6. A vehicle control method, comprising, by a processor:
when a vehicle configured to execute overtake assistance control is executing the overtake assistance control, displaying a first image showing that the overtake assistance control is being executed on a display device of the vehicle, wherein the overtake assistance control includes a first lane change control to move from a cruising lane in which the vehicle is traveling to a target lane and includes a second lane change control to return from the target lane to the cruising lane;
displaying a second image on the display device showing that the overtake assistance control is not being executed when the vehicle is not executing the overtake assistance control; and
when a specific interrupt condition has been satisfied during execution of the overtake assistance control by the vehicle, interrupting the overtake assistance control and displaying the second image on the display device instead of the first image.

7. A non-transitory storage medium storing a program executable by a computer to perform processing, the processing comprising:
when a vehicle configured to executing overtake assistance control is executing the overtake assistance control, displaying a first image showing that the overtake assistance control is being executed on a display device of the vehicle, wherein the overtake assistance control includes a first lane change control to move the vehicle from a cruising lane in which the vehicle is traveling to a target lane and includes a second lane change control to return the vehicle from the target lane to the cruising lane;
displaying a second image on the display device showing that the overtake assistance control is not being executed when the vehicle is not executing the overtake assistance control; and
when a specific interrupt condition has been satisfied during execution of the overtake assistance control by the vehicle, interrupting the overtake assistance control and displaying the second image on the display device instead of the first image.

* * * * *